United States Patent [19]

Kontz

[11] 4,108,590

[45] Aug. 22, 1978

[54] EXTRUSION HEAD

[75] Inventor: Robert F. Kontz, Toledo, Ohio

[73] Assignee: Owens-Illinois, Inc., Toledo, Ohio

[21] Appl. No.: 766,323

[22] Filed: Feb. 7, 1977

[51] Int. Cl.² .................................................. B29D 23/04
[52] U.S. Cl. .................................. 425/466; 264/209; 425/381; 425/467
[58] Field of Search ............ 425/468, 381, 466, 376 R, 425/380, 467; 264/209; 72/253 R, 264, 269, 272

[56] References Cited

U.S. PATENT DOCUMENTS

| 2,765,153 | 10/1956 | Gielow et al. ................ 425/380 X |
| 2,998,624 | 9/1961 | Ricketts ............................. 425/466 |
| 3,382,539 | 5/1968 | Zehr ................................. 425/466 X |

FOREIGN PATENT DOCUMENTS 1,031,670 6/1966 United Kingdom ................... 425/381

*Primary Examiner*—Francis S. Husar
*Assistant Examiner*—Mark Rosenbaum
*Attorney, Agent, or Firm*—Steve M. McLary; Myron E. Click; David H. Wilson

[57] ABSTRACT

An extrusion head and a method for controlling the concentricity of extruded tubular products. A die member has a generally spool shaped configuration with front and rear flanges connected by a hub. The die member has a bore extending completely through it in the hub area. A mandrel is inserted and held in the bore to define an annular space. The rear flange is rigidly connected to a source of molten material to be extruded. The material is introduced into the annular space and issues from the die as a tubular product. Connected to the front flange is a means for deflecting the front flange and the connecting means for deflecting the front flange and the connecting hub relative to the mandrel in order to correct out of concentric formation of the tubular article.

2 Claims, 2 Drawing Figures

EXTRUSION HEAD

BACKGROUND OF THE INVENTION

This invention generally relates to the extrusion of tubular articles. More particularly, this invention relates to an extrusion head for controlling the eccentricity or concentricity of an extruded tubular article. Specifically, this invention relates to such an extrusion head wherein a portion of the head itself is physically deflected to give the desired control of article concentricity.

In the extrusion of tubular articles, such as pipe, from molten material, such as thermoplastic, a continuing problem is control of the concentricity of the finished product. It is undesirable to have a final product which exhibits wall thickness variations when viewed in cross section. To this end, U.S. Pat. No. 3,923,439 purposes the use of movable slides within the extrusion head to compensate for concentricity variations in the output product. This system, while effective, requires a complex and expensive internal mechanism for the extrusion head. I have found that the concentricity of an output tubular article can be adequately controlled by physically deflecting part of the extrusion head with respect to a fixed extrusion mandrel over which the molten material is formed into the final tubular article.

SUMMARY OF THE INVENTION

My invention resides in a new extrusion head being designed to allow control of the concentricity of an extruded tubular article. In the method of operation, a rear flange portion of a generally spool shaped die member, having a bore through a hub portion thereof, is attached to an extrusion material source means. A mandrel is placed in the bore to thereby define an annular space between the inner wall of the bore and the outer surface of the mandrel. Material is flowed through the annular space to form a tubular article. The forward flange portion and the hub portion are deflected relative to the mandrel as is required to maintain a constant wall thickness for the tubular article.

DETAILED DESCRIPTION OF THE DRAWINGS

Figure 1:
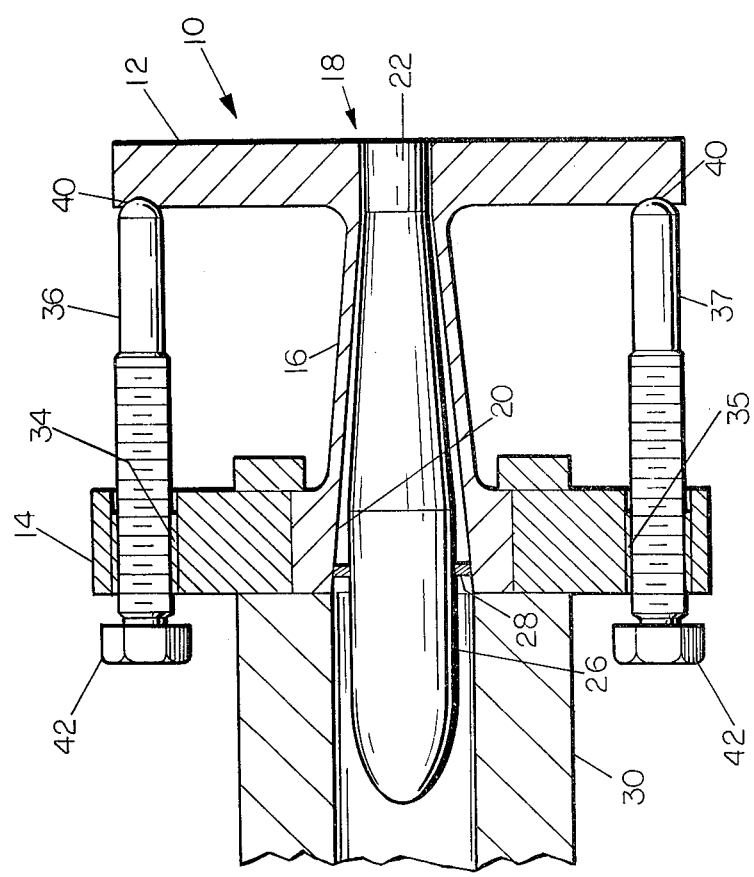
FIG. 1 is a side, elevational view, partially in cross-section, of the extrusion head of the present invention.

FIG. 1 illustrates an extrusion die 10 which contains the provisions of the present invention for controlling the diameter of the output product. The die 10 illustrated in FIG. 1 is designed to allow production of tubular or pipe like thermoplastic products. The die 10 is actually made in several sections which are fastened together by welding or bolting as is commonly known in the art. However, the die 10 could be made as a unitary article if so desired. The basic configuration of the die 10 includes a forward flange portion 12 and a rear flange portion 14 which are connected together by a connecting hub portion 16. The basic configuration thus obtained of the extrusion die 10 is a somewhat spool shaped member which contains an internal annular bore 18 defined by internal sidewalls 20. Inserted into the bore 18 is an extrusion mandrel or core pin 22.

The mandrel 22 may be the type known in the art. The mandrel 22 and die 10 generally define an extrusion head. The result of the insertion of the mandrel 22 into the bore 18 is to define a constricted annular portion or space between the inner sidewalls 20 of the bore 18 and the outer surface 26 of the mandrel 22. This annular space controls the diameter of a tubular product which is extruded through the die 10. By adjustment of the spacing between the sidewalls 20 and the outer surface 26, tubular thermoplastic products of varying internal and external diameter can be produced using the same basic die 10 and mandrel 22. The mandrel 22 is supported near the rear portion of the bore 18 by a spider 28 which connects the mandrel 22 to the internal sidewalls 20. Thermoplastic material will flow around the spider 28 and then reweld itself before issuing from the die 10. The terms "forward" and "rear" which have been used refer to the general path of flow of thermoplastic material. Thermoplastic material is furnished from a means for furnishing a material to be extruded, not shown, into the die 10. While the specific example of molten thermoplastic material is used herein, this invention would be usable with other molten, extrudable, materials. This material flows from left to right as viewed in FIG. 1 and the area in which it enters the die 10 has been referred to as the rear portion of the die 10. The rear flange 14 of the die 10 is firmly affixed to a structural portion 30 of the means for furnishing the material to be extruded. Fixing the rear flange 14 to the structural portion 30 prevents movement of this particular part of the die 10. The rear flange 14 is preferably provided with four bored openings, preferably equally spaced at 90° intervals around its peripheral area. Inserted into these four bored openings are threaded bushings such as those shown at 34 and 35 in FIG. 1. The threaded bushings then have inserted into them jack screws 36 and 37. The jack screws 36 and 37 are sufficiently long to extend completely between the forward flange 12 and rear flange 14 and bear with their tip portions 40 upon the forward flange 12. Additionally, the jack screws 36 and 37 are provided with head portions 42 which can be engaged by a conventional wrench.

In operation, the extrusion of the tubular product around the mandrel 22 will not necessarily always result in a concentric product. That is, it is possible for the product being produced to be slightly thicker on one side than another, thus leading to an unacceptable output product. To correct this situation, one of the four bolts, such as 36 and 37, may be pushed against the forward flange 12 by applying force to their heads 42 and moving them relative to the fixed bushings 34 and 35. Since the rear flange 14 is firmly fixed, the movement of the bolts 36 or 37 relative to its bushing 34 or 35 can only result in bending of the forward flange 12. This bending of the forward flange 12 will result in a consequent deflection of the hub portion 16 and the inner sidewall 20. Such movement will then compensate for the lack of concentricity of the output product and give a product with a constant wall thickness. The inner sidewalls 20 have thus been moved relative to the fixed mandrel 22. Note that in this particular adjustment phase, the mandrel 22 remains fixed, held in position by the spider 28, attached adjacent to the rear flange 14 which in turn is attached to the structural portion 30. The movement of the forward flange 12 creating the distortion of the inner sidewalls 20 allows correction for lack of concentricity of the output product.

Figure 2:
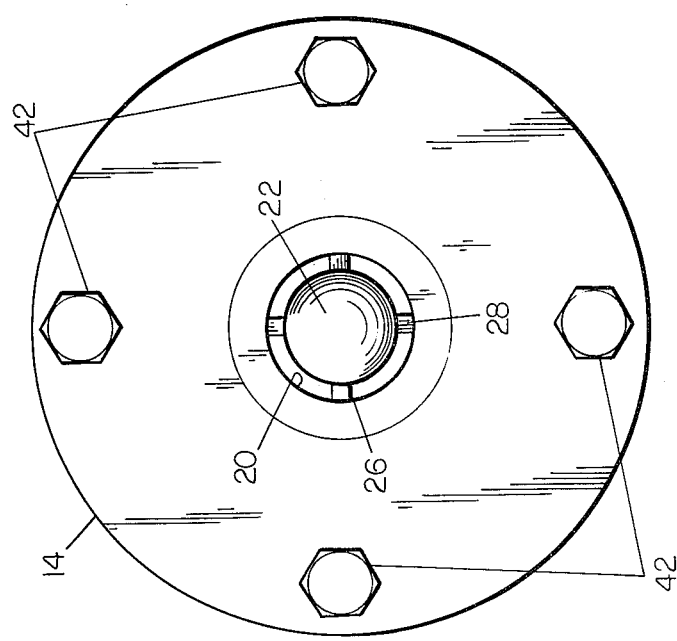
FIG. 2 is a rear, elevational view of the extrusion head of the present invention.

The view of FIG. 2 is a rear view of the die 10 and is primarily included to allow a somewhat clearer view of the spider 28 and the placement of the jack screws around the periphery of the die 10. Since this is a rear view, the jack screws themselves are not visible in this particular figure. However, their screw heads 42 are visible as indicating the approximate position at which the tips 40 of the various jack screws would intercept the forward flange 12, likewise indicating the overall locations of the four jack screws. It is therefore quite apparent from the foregoing description that the jack screws and threaded bushings perform as a means for physically distorting the forward flange 12 to compensate for irregularities in the concentricity of the tubular output product. It should be clear that the manual adjustment provided by the heads 42 could be modified to allow automatic adjustment by fluid motors, electric motors, or other automatic actuating devices. Additionally, the diameter of the output product could be automatically monitored for concentricity and a feedback signal sent to such automatic actuators for the jack screws to allow a constant and running control of the concentricity of the output product.

What I claim is:

1. An extrusion head for the formation of tubular articles from molten material furnished by means for furnishing a material to be extruded which comprises, in combination:

a generally spool-shaped die member having a forward flange portion, and a rear flange portion connected by a hub portion, said hub portion including a bore, having inner sidewalls, extending completely therethrough and through said forward and rear flange portions, said rear flange portion being adapted to be rigidly connected to a structural portion of such a means for furnishing a material to be extruded and connectable to allow introduction of molten material into said bore;

an extrusion mandrel having an outside diameter less than the inside diameter of said bore and inserted into substantially the entire length of said bore in facing relationship with said bore inner sidewalls;

means positioned adjacent said rear flange portion, for supporting said extrusion mandrel in said bore in a fixed location; and means operatively associated with said forward flange portion for deflecting said forward flange portion and said connecting hub portion relative to said extrusion mandrel to correct out of concentric formation of said tubular article by physical distortion of said bore inner sidewalls relative to said fixed extrusion mandrel.

2. The extrusion head of claim 1 wherein said rear flange portion further includes a plurality of holes extending completely through said rear flange portion near its peripheral portion and being substantially equally spaced about its circumference, and wherein said means for deflecting said forward flange includes:

a threaded bushing inserted in each of said plurality of holes; and a threaded jack screw in threadable engagement with each of said threaded bushings, each of said threaded jack screws having a tip portion in engagement with said forward flange portion and a head extending beyond said rear flange portion.

* * * * *